United States Patent
Arnaud et al.

(10) Patent No.: US 10,308,547 B2
(45) Date of Patent: Jun. 4, 2019

(54) HOLLOW GLASS PACKAGING OBJECT OR CONTAINER HAVING AN EXTERNAL ANTI-MIST COATING

(71) Applicant: VERALLIA FRANCE, Courbevoie (FR)

(72) Inventors: Alix Arnaud, Montrouge (FR); Fabio Foti, Paris (FR); Maxime Chestier, Les Pavillons sous Bois (FR)

(73) Assignee: VERALLIA FRANCE, Courbevoie (FR)

( * ) Notice: Subject to any disclaimer, the term of this patent is extended or adjusted under 35 U.S.C. 154(b) by 179 days.

(21) Appl. No.: 15/323,150

(22) PCT Filed: Jul. 2, 2015

(86) PCT No.: PCT/FR2015/051841
§ 371 (c)(1),
(2) Date: Dec. 30, 2016

(87) PCT Pub. No.: WO2016/001600
PCT Pub. Date: Jan. 7, 2016

(65) Prior Publication Data
US 2017/0233285 A1 Aug. 17, 2017

(30) Foreign Application Priority Data
Jul. 3, 2014 (FR) .................................... 14 56409

(51) Int. Cl.
| C03C 17/32 | (2006.01) |
| C03C 17/00 | (2006.01) |
| C03C 17/34 | (2006.01) |
| B65D 25/34 | (2006.01) |
| C09D 5/00 | (2006.01) |
| C09D 129/04 | (2006.01) |
| C09D 175/08 | (2006.01) |

(52) U.S. Cl.
CPC .............. *C03C 17/32* (2013.01); *B65D 25/34* (2013.01); *C03C 17/005* (2013.01); *C03C 17/322* (2013.01); *C03C 17/34* (2013.01); *C03C 17/3405* (2013.01); *C09D 5/00* (2013.01); *C09D 129/04* (2013.01); *C09D 175/08* (2013.01); *C03C 2217/75* (2013.01); *C03C 2218/11* (2013.01)

(58) Field of Classification Search
CPC ....... C03C 17/32; C03C 17/005; C03C 17/34; C03C 17/322; C03C 17/3405; C03C 2217/75; C03C 2218/11; B65D 25/34; C09D 5/00; C09D 129/04; C09D 175/08
See application file for complete search history.

(56) References Cited

U.S. PATENT DOCUMENTS

| 2002/0061950 A1 | 5/2002 | Yamamoto et al. |
| 2004/0096588 A1 | 5/2004 | Brandt |
| 2014/0037874 A1 | 2/2014 | Subramanian et al. |

FOREIGN PATENT DOCUMENTS

| DE | 10 2006 004 913 A1 | 8/2007 |
| EP | 0 908 500 A1 | 4/1999 |
| EP | 1 193 185 A1 | 4/2002 |
| GB | 1267855 A | 3/1972 |
| JP | 2003-64313 A | 3/2003 |
| WO | 2012/100024 A2 | 7/2012 |

OTHER PUBLICATIONS

International Search Report dated Oct. 12, 2015 in PCT/FR2015/051841 filed Jul. 2, 2015.

*Primary Examiner* — Michael C Miggins
(74) *Attorney, Agent, or Firm* — Oblon, McClelland, Maier & Neustadt, L.L.P.

(57) ABSTRACT

The present invention relates to a hollow glass, such as a bottle, glass, flask or pot, consisting of a glass substrate having, on at least one portion of its outer wall, a hydrophilic organic coating, for instance based on polyvinyl alcohol crosslinked with at least one acid selected from citric acid, polyacrylic acid and poly(acrylic acid-co-maleic acid).
In order to manufacture this hollow glass, a solution containing the ingredients for forming the coating and at least one solvent is applied to the glass substrate by spraying, dip-coating or, when the hydrophilic organic coating is a partial coating, by spraying onto the outer wall of the glass substrate on which a mask has been applied, or by screen-printing; the glass substrate coated with said solution is dried; and the substrate is cured thermally or by UV radiation or by electron beam. It is possible to use this hollow glass for revealing a pattern thereon when said hollow glass is removed from a cold storage zone.

19 Claims, No Drawings

HOLLOW GLASS PACKAGING OBJECT OR CONTAINER HAVING AN EXTERNAL ANTI-MIST COATING

CROSS REFERENCE TO RELATED APPLICATION

This application is a National Stage entry under 35 USC 371 of PCT/FR2015/051841, filed on Jul. 2, 2015, and claims priority to French Patent Application No. 1456409, filed on Jul. 3, 2014.

The invention relates to hollow glasses, such as bottles, glasses, etc. which have the novel feature of comprising an anti-fogging coating, namely a hydrophilic coating.

Bottles, glasses and, in general, hollow glass packaging containers and articles, which are placed with their contents in a chilled chamber such as a refrigerator, have a tendency to fog up, which leads to the drawback of no longer seeing their contents.

The applicant company has sought a solution to this problem, this solution having simultaneously led the company to use such formation of fogging to obtain, with a particular preparation of the hollow packaging container or article, a decorative effect.

To that end, the applicant company discovered that it was possible to coat the outer wall of the hollow glass with an anti-water condensation (anti-fog formation) hydrophilic coating, and that, if this coating was applied to one portion only of the outer wall of the hollow glass, forming a positive or negative pattern, this pattern would appear on leaving the chilled chamber (freezer (T<−10° C.) or refrigerator (T<+10° C.)) by contrast between the fogged up zones and those without fogging that remain transparent.

A first subject of the present invention is therefore a hollow glass, such as a bottle, glass, flask or pot, characterized in that it consists of a glass substrate having, on at least one portion of its outer wall, a hydrophilic organic coating.

In accordance with a first embodiment, the hydrophilic organic coating is based on polyvinyl alcohol (PVA) crosslinked with at least one acid (A) selected from citric acid (CA), polyacrylic acid and poly(acrylic acid-co-maleic acid).

In particular, the PVA/A weight ratio may be from 30/70 to 60/40.

The hydrophilic organic coating based on PVA+A may additionally contain at least one antifoaming agent selected especially from polyethylene glycol, polyglycerol, polyacrylates and antifoaming additives based on mixtures of hydrophobic solid materials and polymers, especially of the BYK 014, BYK 016, BYK 093 series from the company BYK, in a proportion especially of from 0.1 to 3 parts by weight per 100 parts by weight of PVA+A.

The hydrophilic organic coating based on PVA+A may additionally contain at least one wetting agent selected especially from polyethylene glycol, polyglycerol, polyacrylates and wetting additives based on polymers of the Schwego® wett series from the company Schwegmann, in a proportion especially of from 0.1 to 3 parts by weight per 100 parts by weight of PVA+A.

The hydrophilic organic coating based on PVA+A may additionally contain at least one thickening/shear-thinning agent selected especially from polyvinylpyrrolidone, xanthan gum, cellulose ethers and laponite, in a proportion especially of from 0.1 to 3 parts by weight per 100 parts by weight of PVA+A.

The hydrophilic organic coating based on PVA+A may additionally contain at least one esterification catalyst agent, such as an alkali metal hypophosphite salt, an alkali metal phosphite, an alkali metal polyphosphate, an alkali metal hydrogen phosphate, a phosphoric acid or an alkylphosphonic acid.

In accordance with a second embodiment, the hydrophilic organic coating is based on at least one polyurethane (PU) and on at least one hygroscopic polymer selected especially from polyvinylpyrrolidone, crosslinked polyvinylpyrrolidone, polyvinylpyrrolidone copolymers, polyvinylpyridine, polyacrylates, polyacrylamides, polyvinyl acetate, polyacrylonitrile, polyvinyl alcohol and polyacrolein.

The polyurethane may be obtained from at least one aliphatic diisocyanate, particularly preferably from 1,6-hexamethylene diisocyanate, an oligomer of 1,6-hexamethylene diisocyanate or a homopolymer of 1,6-hexamethylene diisocyanate.

The polyurethane is additionally obtained preferably at least with a polyalkylene glycol, particularly preferably polyethylene glycol. The average molecular weight of the polyethylene glycol is preferably from 180 g/mol to 630 g/mol, particularly preferably from 190 g/mol to 320 g/mol.

The polyurethane may also be obtained at least with a polyether polyol, particularly preferably polypropylene ether polyol, very particularly preferably trifunctional polypropylene ether polyol. The average molecular weight of the polypropylene ether polyol is, preferably, from 200 g/mol to 600 g/mol, particularly preferably from 350 g/mol to 500 g/mol. The polyurethane may especially be obtained at least with a mixture of polypropylene ether glycol and polyethylene glycol, for example with a weight ratio of the polypropylene ether glycol to the polyethylene glycol of from 2:1 to 1:2.

The polyurethane may also be obtained at least with 1,4-butanediol or with polyethylene glycol and 1,4-butanediol. The weight ratio of the polyethylene glycol to the 1,4-butanediol is preferably from 1:2 to 2:1.

The polyurethane may also be obtained at least with polyethylene glycol, polypropylene ether glycol and/or 1,4-butanediol.

The polyurethane especially has a porous structure. Thus, the polyurethane matrix may absorb moisture, in particular with the use of a hydrophilic polyol component, such as polyethylene glycol.

The hygroscopic polymer is especially a polyvinylpyrrolidone, in particular a polyvinylpyrrolidone having a weight-average molecular weight of from $0.8 \times 10^5$ g/mol to $2.2 \times 10^6$ g/mol, preferably from $1.1 \times 10^5$ g/mol to $1.8 \times 10^5$ g/mol. Its number-average molecular weight may be from $200 \times 10^3$ g/mol to $400 \times 10^3$ g/mol, particularly preferably from $250 \times 10^3$ g/mol to $375 \times 10^3$ g/mol.

Polyvinylpyrrolidone is a hygroscopic polymer that can absorb up to 40% of its own weight in water. The polyvinylpyrrolidone is preferably embedded in the polyurethane matrix. The polyvinylpyrrolidone may be bonded covalently or by adsorption to the polyurethane.

The advantage comes especially from the hygroscopic polyvinylpyrrolidone incorporated into the polyurethane matrix. Thus, the coating may absorb a large amount of moisture in comparison with pure polyurethane. Furthermore, the moisture may be absorbed more rapidly. The condensation of water droplets on the glass substrate at low temperatures and the freezing of the moisture on the glass substrate may therefore be prevented for a longer period of time than by a layer without polyvinylpyrrolidone.

The PU/hygroscopic polymer(s) weight ratio is especially from 1/1000 to 1/1.

The hydrophilic organic coating based on PU/hygroscopic polymer(s) may additionally contain at least one flow agent selected from poly(organo)siloxanes, especially polydimethylsiloxanes, in particular polyester-modified polydimethylsiloxanes, such as polyester-modified hydroxyl-functional polydimethylsiloxanes; polyacrylates; and silicon dioxide, in particular silicon dioxide in the form of nanoparticles; in a proportion especially of from 0.1 to 3 parts by weight per 100 parts by weight of PU+hygroscopic polymer (s).

Suitable poly(organo)siloxane flow agents are, for example, BYK®-306 and BYK®-315. A polyester-modified hydroxyl-functional polydimethylsiloxane is, for example, BYK®-370. Polyacrylate flow agents are especially BYK®-356, BYK®-361N and BYK®-381. Silicon dioxide nanoparticles are, for example, those sold under the trademark NANOBYK®-3650.

The glass substrate may be selected from glass, quartz glass, borosilicate glass, soda-lime glass and organic glasses such as polymethyl methacrylate (PMMA) and polycarbonate (PC).

The hydrophilic organic coating is bonded to the glass substrate by means of an adhesion promoter layer, which is selected especially from silanes, silanes in which the silicon atom is substituted by at least one alkyl chain that may contain at least one functional group such as a hydroxyl, carboxyl or amino group, and/or by at least one hydroxyl, alkoxy or halide group, in particular an amino-functional silane, such as (3-aminopropyl)silanetriol; organophosphates, organo-phosphonic acids, organotitanates, organozirconates and/or organozircoaluminates.

The hydrophilic organic coating may advantageously have a layer thickness of from 0.1 µm to 250 µm, preferably from 1 µm to 100 µm, particularly preferably from 3 µm to 50 µm, the optional adhesion promoter layer having a thickness of from 2 to 100 µm.

In the case where the hydrophilic organic coating coats only a portion of the outer wall of the glass substrate, provision may be made for said hydrophilic organic coating to have been applied to said wall so as to form a negative or positive pattern.

Another subject of the present invention is a process for manufacturing a hollow glass as defined above, characterized in that it comprises the following steps:
(a) a solution containing the ingredients for forming the hydrophilic organic coating and at least one solvent is applied to the glass substrate by spraying, dip-coating or, when the hydrophilic organic coating is a partial coating, by spraying onto the outer wall of the glass substrate on which a mask has been applied, or by screenprinting;
(b) the glass substrate coated with said solution is dried; and
(c) said substrate is cured thermally or by UV radiation or by electron beam, it being possible for an adhesion promoter layer to be applied to the glass substrate before step (a) in particular by immersing said glass substrate in a solution of said adhesion promoter then drying, or by silicate flame treatment.

In the case where the hydrophilic organic coating is based on PVA+A, preferably, in step (a), a mixture is prepared of PVA, of A, of optional antifoaming, wetting, thickening/shear-thinning and catalyst agents, and of water as solvent, said mixture having a final solids content of from 10% to 50% by weight; in step (b), the glass substrate is dried at 30-70° C.; and in step (c), the temperature is raised to 90-150° C.

In the case where the hydrophilic organic coating is based on PU+hygroscopic polymer(s), preferably, in step (a), a solution is prepared that contains the isocyanate and polyol compound(s) intended to form the polyurethane(s) by polyaddition, where appropriate at least one catalyst for forming the polyurethane(s), the hygroscopic polymer(s), where appropriate the flow agent(s), and at least one solvent selected especially from diacetone alcohol, tert-butanol, ketones and non-polar solvents such as xylene; in step (b), the glass substrate is dried in order to eliminate the solvent, especially at a temperature of from 30 to 70° C., preferably from 45° C. to 55° C.; and in step (c), the temperature is brought to 100-150° C., preferably 115° C.-150° C., in particular over a period of from 20 min to 60 min, especially from 30 min to 50 min.

The isocyanate compound has at least two isocyanate groups. The isocyanate groups may be free or blocked by protective chemical groups.

The isocyanate compound may be aliphatic, cycloaliphatic, aromatic or heterocyclic. In one preferred embodiment, the isocyanate compound comprises an aliphatic diisocyanate, particularly preferably 1,6-hexamethylene diisocyanate.

The isocyanate compound may be used in its monomer form. As a variant, oligomers or homopolymers based on the isocyanate monomer may be used. Even copolymers of various isocyanate compounds or of an isocyanate compound and, for example, a polyol may be used.

The isocyanate compound may also have at least three isocyanate groups.

The polyol has at least two hydroxyl groups.

The polyol may be linear, branched or cyclic. The polyol may, for example, comprise a polyether polyol, a polyester polyol, a hydroxylated polyacrylate or a hydroxylated polycarbonate. Copolymers or combinations of various polyols may also be used.

The polyol may comprise at least one polyalkylene glycol, for example polypropylene glycol, particularly preferably polyethylene glycol, which is hygroscopic. The average molecular weight of the polyethylene glycol is preferably from 180 g/mol to 630 g/mol, particularly preferably from 190 g/mol to 320 g/mol.

The polyol may also comprise at least one polyalkylene ether polyol, preferably polypropylene ether polyol, particularly preferably a trifunctional polypropylene ether polyol. The average molecular weight of the polypropylene ether polyol is preferably from 200 g/mol to 600 g/mol, particularly preferably from 350 g/mol to 500 g/mol. The polyol may comprise at least one mixture of polypropylene ether glycol and polyethylene glycol, for example with a weight ratio of the polypropylene ether glycol to the polyethylene glycol of from 2:1 to 1:2.

The polyol may also comprise at least 1,4-butanediol. In one preferred embodiment, the polyol comprises at least one polyalkylene glycol (preferably polyethylene glycol) and 1,4-butanediol. The weight ratio of the polyalkylene glycol to the 1,4-butanediol is from 1:2 to 2:1.

The polyol may also comprise at least 1,4-butanediol and polypropylene ether glycol or at least 1,4-butanediol, polyethylene glycol and polypropylene ether glycol. The polyol may contain at least polyethylene glycol, polypropylene ether glycol and/or 1,4-butanediol.

The isocyanate compound may thus contain at least 1,6-hexamethylene diisocyanate, an oligomer of 1,6-hexamethylene diisocyanate or a homopolymer of 1,6-hexamethylene diisocyanate; the polyol compound may contain at least polyethylene glycol, polypropylene ether glycol and/or 1,4-butanediol; and the solution may contain a catalyst, preferably dibutyltin dilaurate.

In particular, the solution may contain from 0.001% by weight to 0.1% by weight of the catalyst. The catalyst increases the rate of reaction of the polyol and of the isocyanate compound. Preferably, organometallic compounds of bismuth or tin, such as a tin carboxylate or a bismuth carboxylate, particularly preferably dibutyltin dilaurate, are used as catalysts. Amines, for example triethylenediamine, or azines, for example 1,4-diazabicyclo[2.2.2]octane, may also be used as catalysts.

The present invention also relates to the use of a hollow glass as defined above for revealing a pattern when said hollow glass is removed from a cold storage zone.

The following examples illustrate the present invention without however limiting the scope thereof. In these examples, the following abbreviations have been used:
DAA: diacetone alcohol
DBTL: dibutyltin dilaurate
PEG: polyethylene glycol
PVP: polyvinylpyrrolidone
PVA: polyvinyl alcohol
CA: citric acid

EXAMPLE 1

The following formulation was prepared for an organic anti-fogging layer:

| | |
|---|---|
| PVA | 24.15 g |
| CA | 20.84 g |
| Water | 55.00 g |
| Antifoaming agent sold by the company BYK under the trademark BYK ®-016 | 1.25 g |

The water of the formulation was placed in a reactor and brought to 50° C. over 20 minutes, then the CA was added, with everything being stirred at 150 rpm.

When the CA had been dissolved, the temperature of the mixture was brought to 90° C. over 20 minutes.

The PVA was then added. The formulation was kept at 90° C. for 4 h until the PVA had completely dissolved.

The formulation was then cooled to 50° C. over 30 minutes and the antifoaming agent was added thereto.

The formulation was then decanted into containers. This formulation has a rheology suitable for the screenprinting deposition technique.

Ovation (transparent clear glass) and champagne (green glass) bottles were then subjected to a silicate flame treatment in order to promote the adhesion with the organic anti-fogging layer. Next, the formulation prepared above was deposited by the screenprinting technique on the bottles thus prepared, in order to form a decorative pattern on each of them.

The bottles were dried at 50° C. for 15 minutes in order to evaporate the water, then they were heated at 120° C. for 40 minutes in order to bring about the crosslinking of the PVA with the CA.

They were left to cool to ambient temperature.

The bottles were then placed in the freezer at –18° C. for 1 h. The bottles were removed from the refrigerator once they were chilled. The desired decorative pattern then appeared via the formation of fogging solely on the uncoated portions of the bottles, by contrast with the transparent coated zones.

EXAMPLE 2

The following formulation was prepared for an organic anti-fogging layer:

| Ingredient | Parts by weight |
|---|---|
| Isocyanate sold by the company Bayer under the trademark Desmodur N3200 | 20.440 |
| PEG | 11.185 |
| PVP | 3.579 |
| DBTL | 0.099 |
| Polydimethylsiloxane sold by the company BYK under the trademark BYK ®-370 | 0.138 |
| DAA | 64.649 |

Removable adhesive films were applied to ovation (transparent clear glass) and champagne (green glass) bottles, which films were cut to form two types of pattern: negative and positive.

A solution of amino-functional silane was sprayed onto these bottles, then the bottles were dip-coated in the previously prepared anti-fogging solution.

The bottles were dried at 50° C. for 15 minutes (drying phase with evaporation of the solvent), then the bottles were heated at 120° C. for 40 minutes (crosslinking of the isocyanate with the polyol in the presence of the catalyst). They were left to cool to ambient temperature and then the masking films were removed in order to reveal the uncoated portions.

The bottles were then placed in the refrigerator at 0° C. for 1 h. The bottles were removed once they were chilled. The desired decorative pattern then appeared via the formation of fogging solely on the uncoated portions of the bottles, by contrast with the transparent coated zones.

EXAMPLE 3

The following formulation was prepared for an organic anti-fogging layer:

| | |
|---|---|
| PVA | 35.01 g |
| Poly(acrylic acid-co-maleic acid) | 9.98 g |
| Water | 55.00 g |
| Antifoaming agent sold by the company BYK under the trademark BYK ®-016 | 1.25 g |

The water of the formulation was placed in a reactor and brought to 50° C. over 20 minutes, then the poly(acrylic acid-co-maleic acid) was added, with everything being stirred at 150 rpm.

When the poly(acrylic acid-co-maleic acid) had been dissolved, the temperature of the mixture was brought to 50° C. over 20 minutes.

The PVA was then added. The formulation was kept at 90° C. for 4 h until the PVA had completely dissolved.

The formulation was then cooled to 50° C. over 30 minutes and the antifoaming agent was added thereto.

The formulation was then decanted into containers.

Removable adhesive films were applied to ovation (transparent clear glass) and champagne (green glass) bottles, which films were cut to form two types of pattern: negative and positive.

The bottles were then subjected to a silicate flame treatment in order to promote the adhesion with the organic anti-fogging layer, and then the formulation prepared above was applied to the bottles thus prepared, in order to form a decorative pattern on each of them.

The bottles were dried at 50° C. for 15 minutes in order to evaporate the water, then they were heated at 120° C. for 40 minutes in order to bring about the crosslinking of the PVA with the poly(acrylic acid-co-maleic acid).

They were left to cool to ambient temperature and then the masking films were removed in order to reveal the uncoated portions.

The bottles were then placed in the freezer at 0° C. for 1 h. The bottles were removed from the refrigerator once they were chilled. The desired decorative pattern then appeared via the formation of fogging solely on the uncoated portions of the bottles, by contrast with the transparent coated zones.

The invention claimed is:

1. A hollow glass packaging container or article, comprising:
 a glass substrate and,
 on at least one portion of an outer wall of the glass substrate, an anti-water condensation hydrophilic organic coating,
 wherein the hydrophilic organic coating has been applied to the outer wall of the glass substrate, thereby forming a negative or positive pattern.

2. The packaging container or article as claimed in claim 1, wherein the hydrophilic organic coating further comprises at least one antifoaming agent.

3. The packaging container or article as claimed in claim 1, wherein the hydrophilic organic coating further comprises at least one wetting agent.

4. The packaging container or article as claimed in claim 1, wherein the hydrophilic organic coating further comprises at least one thickening/shear-thinning agent.

5. The packaging container or article as claimed in claim 1, wherein the hydrophilic organic coating based on PVA+A further comprises at least one esterification catalyst agent.

6. The packaging container or article as claimed in claim 1, wherein the glass substrate is selected from the group consisting of glass, quartz glass, borosilicate glass, soda-lime glass and organic glasses.

7. The packaging container or article as claimed in claim 1, wherein the hydrophilic organic coating is bonded to the glass substrate by an adhesion promoter layer.

8. The packaging container or article as claimed in claim 1, wherein the hydrophilic organic coating has a layer thickness of from 0.1 μm to 250 μm and wherein an optional adhesion promoter layer, if present, has a thickness of from 2 to 100 μm.

9. The packaging container or article as claimed in claim 1, wherein the hydrophilic organic coating is based on polyvinyl alcohol (PVA) crosslinked with at least one acid (A) selected from the group consisting of citric acid (CA), polyacrylic acid and poly(acrylic acid-co-maleic acid).

10. The packaging container or article as claimed in claim 9, wherein a PVA/A weight ratio is from 30/70 to 60/40.

11. The packaging container or article as claimed in claim 1, wherein the hydrophilic organic coating is based on at least one polyurethane (PU) and on at least one hygroscopic polymer.

12. The packaging container or article as claimed in claim 11, wherein the hygroscopic polymer is a polyvinylpyrrolidone.

13. The packaging container or article as claimed in claim 11, wherein a PU/hygroscopic polymer(s) weight ratio is from 1/1000 to 1/1.

14. The packaging container or article as claimed in claim 11, wherein the hydrophilic organic coating further comprises at least one flow agent.

15. A process for manufacturing the packaging container or article of claim 1, the process comprising:
 (a) applying a solution comprising ingredients suitable for forming the hydrophilic organic coating and at least one solvent to the glass substrate by spraying, dip-coating or, when the hydrophilic organic coating is a partial coating, by spraying onto the outer wall of the glass substrate on which a mask has been applied, or by screenprinting;
 (b) drying the glass substrate coated with said solution; and
 (c) curing said substrate thermally or by UV radiation or by electron beam,
 wherein the process optionally further comprises applying an adhesion promoter layer to the glass substrate before the applying (a).

16. The process as claimed in claim 15,
 wherein the applying (a) comprises preparing a mixture of PVA, of A, of optional antifoaming, wetting, thickening/shear-thinning and/or catalyst agents, and of water as solvent,
 said mixture has a final solids content of from 10% to 50% by weight;
 the drying (b), is at 30-70° C.; and
 the curing (c), comprises raising a temperature of the glass substrate to 90-150° C.

17. The process as claimed in claim 15,
 wherein the hydrophilic organic coating is based on at least one polyurethane (PU) and on at least one hygroscopic polymer,
 the applying (a) comprises preparing a solution that comprises isocyanate and polyol compound(s) suitable for forming the at least one polyurethane by polyaddition, optionally at least one catalyst for forming the at least one polyurethane, the at least one hygroscopic polymer, optionally flow agent(s), and at least one solvent;
 the drying (b) comprises drying the glass substrate and thereby eliminating the solvent; and
 the curing (c) comprises bringing a temperature to 100-150° C.

18. The process as claimed in claim 17, wherein the isocyanate compound comprises at least 1,6-hexamethylene diisocyanate, an oligomer of 1,6-hexamethylene diisocyanate or a homopolymer of 1,6-hexamethylene diisocyanate;
 the polyol compound comprises at least polyethylene glycol, polypropylene ether glycol and/or 1,4-butanediol; and
 the solution comprises a catalyst.

19. A method of revealing a pattern, the method comprising:
 removing the packaging container or article of claim 1 from a cold storage zone, thereby revealing the pattern.

* * * * *